Oct. 1, 1935.   P. S. BAUER   2,015,835
FRONT WHEEL INDICATOR
Filed Oct. 29, 1934
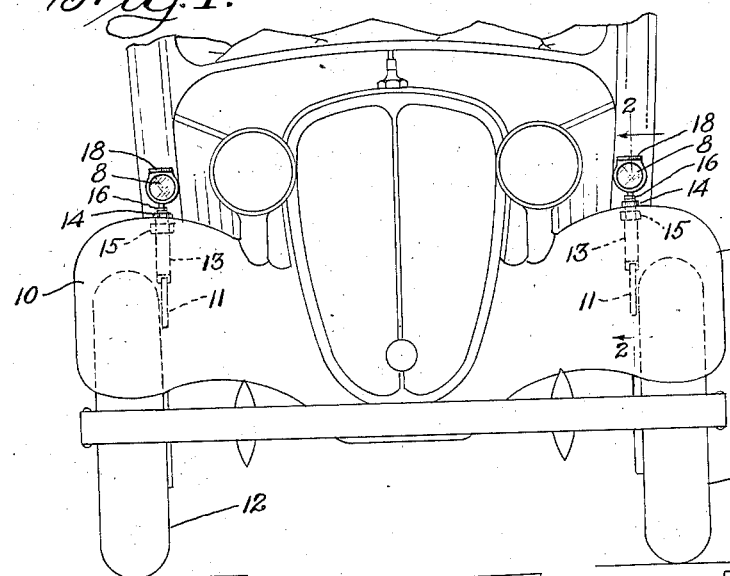
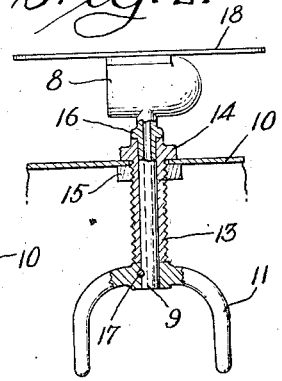
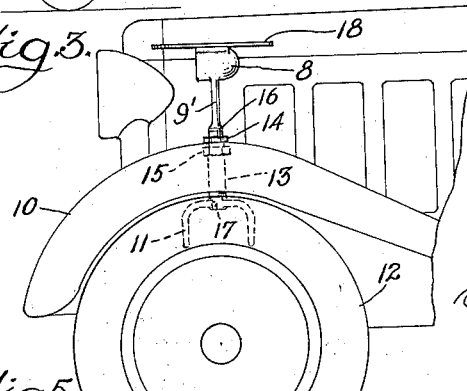
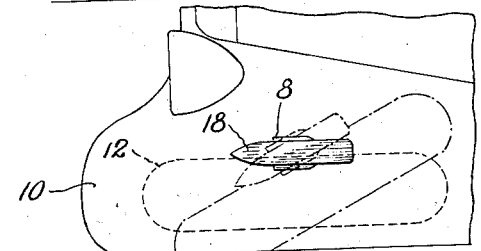
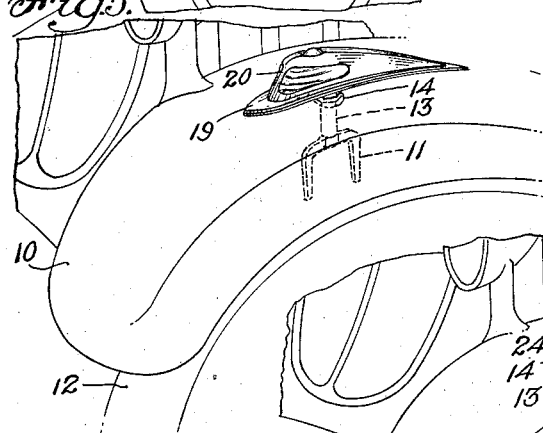
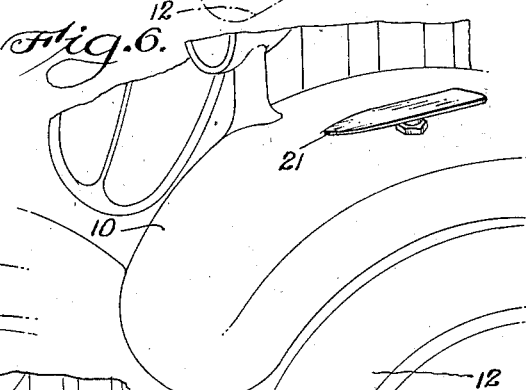
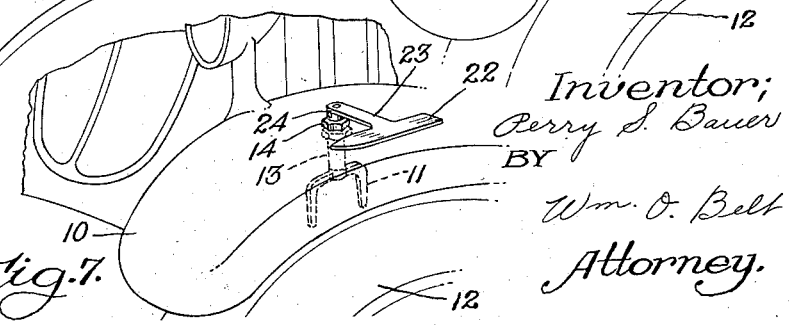
Inventor;
Perry S. Bauer
BY
Wm. O. Belt
Attorney.

Patented Oct. 1, 1935

2,015,835

UNITED STATES PATENT OFFICE 2,015,835

FRONT WHEEL INDICATOR

Perry S. Bauer, Chicago, Ill.

Application October 29, 1934, Serial No. 750,495

8 Claims. (Cl. 116—31)

The front wheels of automotive vehicles, particularly pleasure cars, are usually concealed from the view of the driver by fenders so that the driver cannot tell, when the car is standing still, whether the wheels are directed forwardly, to the right or to the left. It is the common practice for a driver to start his car moving slowly and for a short distance so that he may discover the position of the front wheels, which are the steering wheels of the vehicle. This is particularly true when the car has been parked alongside a curb and is generally true when a car is being started from some stopped position either parked or stored or temporarily stopped. In other words, it may be said to be a general rule that the driver of a car is unable to see the front wheels and has no means of knowing when in the driver's seat the exact position of the front wheels until he has started the car in motion and determined by the movement of the car the probable position of the front wheels. This handicaps the driver in getting a start, often causes a front wheel to be scraped against a curb and sometimes causes the car to become wedged against the curb so that it cannot be cleared for travel, especially if the parking space is limited, without a great deal of trouble; and it is also a handicap upon a driver learning to drive a car and upon those who do not drive regularly or frequently because the driver must depend upon the feel of the car to determine the position of the wheels which are actually steering the car in its movement and, while long practice teaches a driver how to determine the position of the front wheels without endangering the car in close parking or crowded traffic, it is not easy to learn, and even an experienced driver must move his car before he can determine whether the wheels are positioned for direct travel forward or backward or are angularly positioned to the right or to the left.

It is the primary object of my invention to provide means conveniently located within the range of vision of the driver which at all times will indicate the direction position of one or both of the front wheels of the vehicle.

Another object of the invention is to provide a front wheel indicator located within the range of vision of the driver and adapted to be operated by a front wheel for indicating at all times the direction position of the front wheel.

And a further object of the invention is to provide a front wheel indicator located within the natural line of vision of the driver of the vehicle so that he can instantly determine before starting the car, as he is starting, or immediately after the car is started in motion, the exact position of the front wheels with respect to a normal forward or rearward direction of travel.

In the accompanying drawing I have illustrated selected embodiments of the invention for the purposes of this application and referring thereto Fig. 1 is a front view partly broken away of an automobile embodying my invention;

Fig. 2 is an enlarged sectional view on the line 2—2 of Fig. 1;

Fig. 3 is a side elevation of the front end of an automobile showing my invention with the indicator elevated considerably above the fender;

Fig. 4 is a detail top plan view showing the indicator of Fig. 1 or of Fig. 3; and Figs. 5, 6 and 7 are detail views showing other embodiments of the invention.

An indicator may be provided for one or both front wheels but I prefer to use indicators for both wheels.

It is customary to provide the parking lamps in the new model automobiles on the front fenders and I have found it convenient to combine the indicators with the parking lamps.

Referring to Figs. 1 and 2, the parking lamp 8 is mounted on a stem 9 which extends through the fender 10 and is provided at its lower end with a fork 11, the arms of which are positioned alongside the tire of the front wheel 12 as shown in Figs. 1 and 3. I prefer to space the yoke slightly away from the tire so that it will not engage the tire when the automobile is traveling in a straight forward or reverse direction. The lamp may be mounted on the fender in any suitable manner as by means of a threaded sleeve 13 which extends through the fender and is provided with an annular shoulder 14 to engage the upper side of the fender and with a nut 15 to engage the lower side of the fender whereby the sleeve is tightly secured to the fender. The stem is provided with an annular shoulder 16 which rests upon the upper end of the sleeve and the yoke is secured on the stem against the lower end of the sleeve by a key 17 or other suitable means. The sleeve acts as a bearing for the stem and the stem is capable of limited rotative movement in the sleeve as the yoke is moved by the tire of the wheel when the direction of movement of the wheel is changed. The lamp 8 is rigidly mounted on the stem to turn with the yoke and the top of the lamp may be formed into an indicator varying in size, shape and configuration, as desired. A simple embodiment of the invention consists in securing an elongated strip 18 on the top of the lamp. By extending the stem upward as indicated at 9', Fig. 3, the indicator may be raised to any desired elevation necessary to enable the driver to see it in his ordinary driving position. In some cars the driver sits high and in others he sits low, in some cars the fenders are high and in others they are low, and for these and other reasons it is desirable to mount the indicator high or low so that the driver can see it in his line of vision over the right wheel or over the left wheel according to different conditions.

In Fig. 5 I have shown the indicator 19 made as the base of the lamp 20 and in Fig. 6 I have shown the indicator 21 mounted on the stem without a lamp. In Fig. 7 the indicator 22 is carried by a laterally extending arm 23 which is mounted on the upper end of the stem 24.

In all forms of the invention the indicator is rigid with the yoke and the yoke is arranged to be moved by the tire of the front wheel as the wheel is turned to the right or to the left. The indicator will show the exact position of the wheel and, while the wheel is concealed from the operator by the fender, he can determine by the indicator the exact position of the wheel. This is of particular value and importance to the driver in parking, in starting up from parking position, in congested traffic, in moving on and off of tracks, in following ruts and winding roads, and in many other conditions of travel where a knowledge of the position of the steering wheels would help the driver in steering the vehicle.

I have shown the invention in several embodiments adapted for a pleasure car but it can be used on other automotive vehicles and it will readily be understood that because of the different styles and models of automobiles the mounting of the indicator must be varied more or less. The mountings shown are intended as an indication of ways and means for mounting the indicator rather than as a limitation upon the invention and I reserve the right to make all such changes in the form, construction and arrangement of parts as may be necessary or desirable to satisfy different conditions and within the scope of the following claims.

I claim:

1. In an automotive vehicle which has a front wheel and a fender over the wheel, the combination of a stem rotatively mounted on the fender, a yoke arranged alongside and parallel to the wheel to be operated thereby to rotate the stem, and an indicator operated by the stem to indicate the direction position of the wheel.

2. In an automotive vehicle which has a front wheel and a fender over the wheel, the combination of a stem rotatively mounted on the fender, a yoke arranged alongside and parallel to the wheel to be operated thereby to rotate the stem, and a lamp mounted on the stem and operated thereby to indicate the direction position of the wheel.

3. In an automotive vehicle which has a front wheel and a fender over the wheel, the combination of a stem rotatively mounted on the fender, a yoke arranged alongside and parallel to the wheel to be operated thereby to rotate the stem, a lamp mounted on the stem to rotate therewith, and an indicator rigidly mounted on the lamp to indicate the direction position of the wheel.

4. In an automotive vehicle which has a front wheel and a fender over the wheel, the combination of a stem rotatively mounted on the fender, a yoke arranged alongside and parallel to the wheel to be operated thereby to rotate the stem, a lamp mounted on the stem to rotate therewith, and an indicator rigidly mounted on top of the lamp to indicate the direction position of the wheel.

5. In an automotive vehicle which has a front wheel and a fender over the wheel, the combination of a stem rotatively mounted on the fender, a yoke arranged alongside and parallel to the wheel to be operated thereby to rotate the stem, a lamp mounted on the stem to rotate therewith, and an indicator at the bottom of the lamp to indicate the direction position of the wheel.

6. In an automotive vehicle which has a front wheel and a fender over the wheel, the combination of a stem rotatively mounted on the fender, a yoke arranged alongside and parallel to the wheel to be operated thereby to rotate the stem, an indicator to indicate the direction position of the wheel, and an arm connecting the indicator to the stem.

7. In an automotive vehicle which has a front wheel and a fender over the wheel, the combination of a sleeve rigidly secured in the fender, a stem extending through the sleeve, a yoke on the lower end of the stem arranged alongside and parallel to the wheel to be operated thereby to rotate the stem, means for supporting the stem in the sleeve, and an indicator operated by the stem to indicate the direction position of the wheel.

8. In an automotive vehicle which has a front carrying wheel adapted to be operated to steer the vehicle, and a fender over the wheel, the combination of an indicator mounted on the fender to indicate the direction position of the wheel and means engageable with the wheel and connected with the indicator to move the indicator to the right and to the left corresponding to the movement of the wheel.

PERRY S. BAUER.